(12) United States Patent
Baghsorkhi et al.

(10) Patent No.: US 12,045,677 B2
(45) Date of Patent: Jul. 23, 2024

(54) UNIFIED PROGRAMMING MODEL FOR FUNCTION AS A SERVICE COMPUTING

(71) Applicant: Intel Corporation, Santa Clara, CA (US)

(72) Inventors: Sara Baghsorkhi, Los Gatos, CA (US); Mohammad R. Haghighat, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1067 days.

(21) Appl. No.: 16/722,811

(22) Filed: Dec. 20, 2019

(65) Prior Publication Data

US 2020/0137163 A1 Apr. 30, 2020

(51) Int. Cl.
*G06F 9/54* (2006.01)
*G06F 9/48* (2006.01)
*G06F 9/50* (2006.01)

(52) U.S. Cl.
CPC ............ *G06F 9/547* (2013.01); *G06F 9/4856* (2013.01); *G06F 9/5088* (2013.01); *G06F 9/541* (2013.01); *G06F 2209/501* (2013.01)

(58) Field of Classification Search
None
See application file for complete search history.

(56) References Cited

U.S. PATENT DOCUMENTS

2011/0196914 A1* 8/2011 Tribbett ............... G06F 9/541
709/230

OTHER PUBLICATIONS

Ahmad et al., "Virtual machine migration in cloud data centers: a review, taxonomy, and open research issues", Mar. 13, 2015, Springer Science+Business Media New York, pp. 2473-2515 (Year: 2015).*
Ahmed et al., "A Framework for Faster Porting of Scientific Applications Between Heterogeneous Clouds", 2018, ICST Institute for Computer Sciences, Social Informatics and Telecommunications Engineering 2018, pp. 27-43. (Year: 2018).*
International PCT Patent Application No. PCT/US2019/027659, entitled "Function as a Service (FAAS) System Enhancements," filed on Apr. 16, 2019, 301 pages.

* cited by examiner

*Primary Examiner* — Qing Yuan Wu
(74) *Attorney, Agent, or Firm* — Jordan IP Law, LLC

(57) ABSTRACT

Systems, apparatuses and methods may provide for technology that detects a generic cloud service call in an application, wherein platform-specific parameters are unspecified in the cloud service call. The technology may also select a first cloud platform based on one or more performance constraints associated with the first cloud platform and automatically generate a first platform-specific service call based on the cloud service call and the first set of parameters. In one example, the technology also maps the cloud service call to the first platform-specific service call. Additionally, the technology may migrate the cloud service call to a second cloud platform without rewriting the generic cloud service call.

24 Claims, 13 Drawing Sheets

UNIFIED PROGRAMMING MODEL FOR FUNCTION AS A SERVICE COMPUTING

TECHNICAL FIELD

Embodiments generally relate to application programming interfaces (APIs). More particularly, embodiments relate to a unified programming model for function as a service (FaaS) computing.

BACKGROUND

When an application is deployed on a cloud computing infrastructure ("cloud"), the application programming interfaces (APIs) and protocols used within the application are typically tightly coupled to a specific platform (e.g., operated by a specific cloud provider). As the landscape of cloud providers grows and becomes more heterogeneous, this tight coupling may present challenges with regard to performance, scalability, efficiency and/or cost effectiveness. For example, if a more beneficial service platform becomes available after a cloud application is deployed (or during deployment), the overhead of migrating the cloud application to the more beneficial service platform may outweigh the benefits of the new service platform. Such a situation may be even more pronounced in a function as a service (FaaS) architecture in which a single purpose API endpoint is provisioned on a cloud to receive and run code execution requests for a relatively short amount of time.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
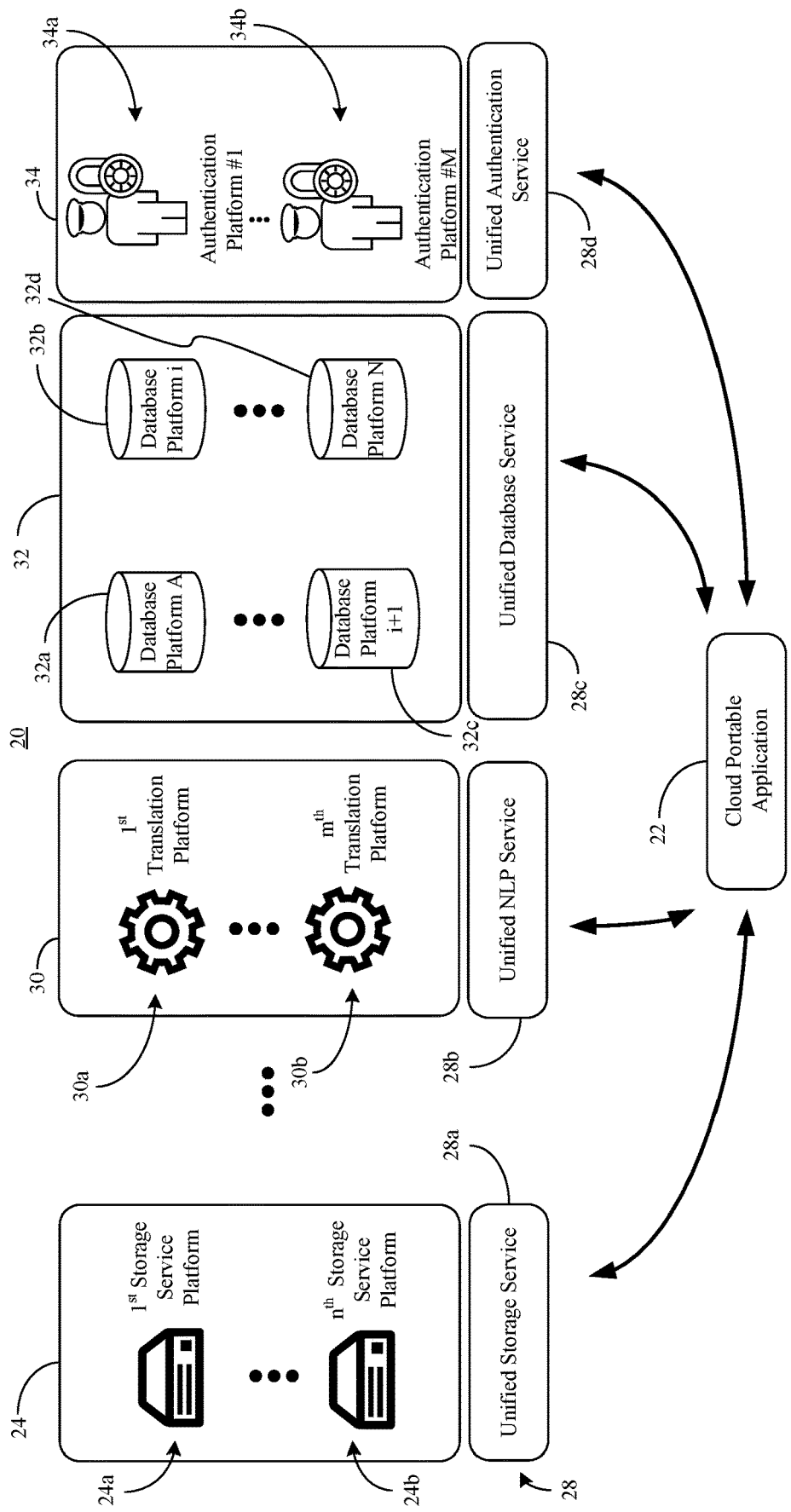
FIG. 1 is a block diagram of an example of a heterogeneous cloud according to an embodiment.

Turning now to FIG. 1, a heterogeneous cloud 20 is shown in which a cloud portable application 22 uses a storage service, a natural language processing (NLP) service, a database service, an authentication service, and so forth, during operation. In an embodiment, a unified programming model 28 (28a-28d) such as, for example, ONEAPI, is used to configure the application 22 for execution across the heterogeneous cloud 20, which may include vastly different types of hardware resources (e.g., host processors, graphics processors, field-programmable gate arrays/FPGAs, special-purpose accelerators, etc.).

In the illustrated example, a cloud platform is automatically selected from a set of heterogeneous storage service platforms 24 (24a, 24b) to provide the storage service. For example, a first storage service platform 24a ("1$^{st}$ Storage Service Platform") might be an AMAZON SIMPLE STORAGE SERVICE (S3) platform, whereas a second storage service platform 24b ("n$^{th}$ Storage Service Platform") may be a GOOGLE CLOUD STORAGE platform. Thus, the storage service may be obtained from different cloud providers/vendors having different platform-specific parameters to provide the storage service support. In an embodiment, the unified programming model 28 includes a storage service component 28a to facilitate the configuration of the application 22 on the selected cloud platform in the set of heterogeneous storage service platforms 24.

As will be discussed in greater detail, the storage service component 28a may enable transparent migrations of the application 22 (e.g., from the perspective of the application user) between the cloud platforms in the set of heterogeneous storage service platforms 24 based on changes in available storage services (e.g., features, pricing) and/or changes in performance constraints of the application 22. Such an approach may enhance performance, scalability, efficiency and/or cost effectiveness.

A cloud platform may also be automatically selected from a set of heterogeneous NLP service platforms 30 (30a, 30b) to provide the NLP service. For example, a first NLP service platform 30a ("1$^{st}$ Translation Platform") may be an AMAZON TRANSLATE platform, whereas a second NLP service platform 30b ("m$^{th}$ Translation platform") might be a GOOGLE TRANSLATE platform. Thus, the NLP service may also be obtained from different cloud providers/vendors having different platform-specific parameters to provide the NLP service support. In an embodiment, the unified programming model 28 includes an NLP service component 28b to facilitate the configuration of the application 22 on the selected cloud platform in the set of heterogeneous NLP service platforms 30.

Thus, the NLP service component 28b may enable transparent migrations of the application 22 (e.g., from the perspective of the application user) between the cloud platforms in the set of heterogeneous NLP service platforms 30 based on changes in available NLP services (e.g., features, pricing) and/or changes in performance constraints of the application 22. Such an approach may further enhance performance, scalability, efficiency and/or cost effectiveness.

In addition, a cloud platform may be automatically selected from a set of heterogeneous database service platforms 32 (32a-32d) to provide the database service. For example, a first database service platform 32a ("Database Platform A") might be an AMAZON DYNAMODB platform, a second database service platform 32b ("Database Platform i") may be an AMAZON AURORA platform, a third database service platform 32c ("Database Platform i+1") might be a GOOGLE CLOUD FIRESTORE platform, and a fourth database service platform 32d ("Database Platform N") may be a GOOGLE CLOUD SQL platform. Thus, the database service may be obtained from different cloud providers/vendors having different platform-specific parameters to provide the database service support. In an embodiment, the unified programming model 28 includes a database service component 28c to facilitate the configuration of the application 22 on the selected cloud platform in the set of heterogeneous database service platforms 32.

The database service component 28c enables transparent migrations of the application 22 between the cloud platforms in the set of heterogeneous database service platforms 32 based on changes in available database services (e.g., features, pricing) and/or changes in performance constraints of the application 22. Such an approach may further enhance performance, scalability, efficiency and/or cost effectiveness.

Moreover, a cloud platform may be automatically selected from a set of heterogeneous authentication service platforms 34 (34a, 34b) to provide the authentication service. For example, a first authentication service platform 34a ("Authentication Platform #1") may be an AMAZON CONGNITO platform, whereas a second authentication service platform 34b ("Authentication Platform # M") might be a GOOGLE FIREBASE platform. Thus, the authentication service may be obtained from different cloud providers/vendors having different platform-specific parameters to provide the authentication service support. In an embodiment, the unified programming model 28 includes an authentication service component 28d to facilitate the configuration of the application 22 on the selected cloud platform in the set of heterogeneous authentication service platforms 34.

In one example, the authentication service component 28d enables transparent migrations of the application 22 between the cloud platforms in the set of heterogeneous authentication service platforms 34 based on changes in available authentication services (e.g., features, pricing) and/or changes in performance constraints of the application 22. Such an approach may further enhance performance, scalability, efficiency and/or cost effectiveness.

FaaS is an event-oriented highly-scalable computer code execution model that typically provisions a single purpose API endpoint on a cloud computing infrastructure to receive and run the code execution requests for a relatively short amount of time. Such code execution requests and/or executions of requested code are variously and commonly referred to as lambdas, functions, actions, and/or run-to-completion procedures. The illustrated approach to porting portions of the application 22 to cloud platforms and migrating portions of the application 22 between cloud platforms may be particularly advantageous in a FaaS setting due to the transient nature of the linkages between functions and the underlying hardware.

Figure 2:
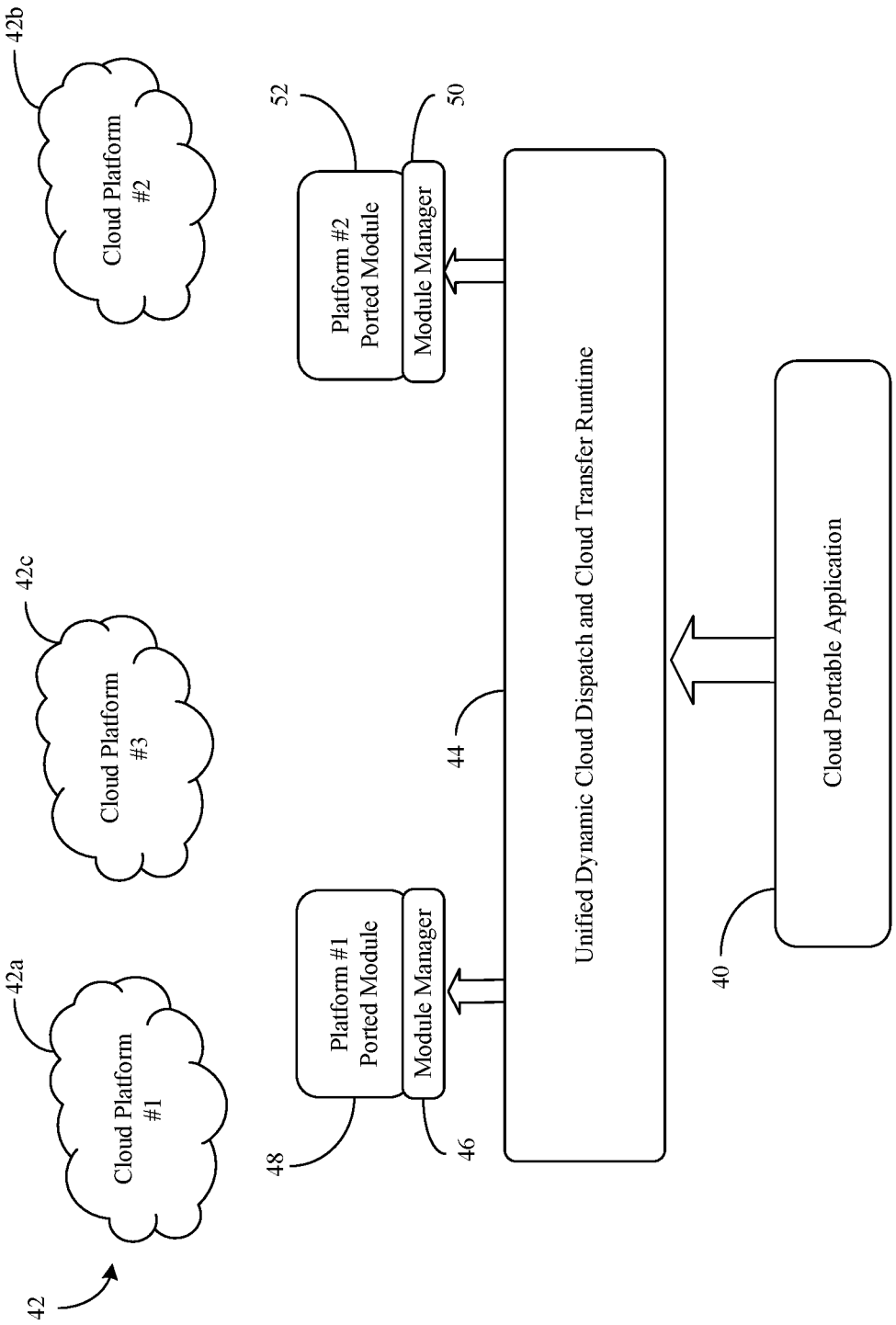
FIG. 2 is a block diagram of an example of the porting of a cloud application to one or more modules running on a heterogeneous cloud according to an embodiment.

FIG. 2 shows the porting of a cloud portable application 40 (e.g., including FaaS lambdas, functions, actions and/or run-to-completion procedures) to a heterogeneous cloud 42 (42a-42c) that includes a first cloud platform 42a (e.g., GOOGLE cloud), a second cloud platform 42b (e.g., MICROSOFT cloud), and a third cloud platform 42c (e.g., AMAZON cloud). In the illustrated example, a dispatch 44 ("Unified Dynamic Cloud Dispatch and Cloud Transfer Runtime") uses a first module manager 46 to generate a first ported module 48 for the first cloud platform 42a and uses a second module manager 50 to generate a second ported module 52 for the second cloud platform 42b. At deployment time the dispatch 44 surveys the available cloud services/vendors and based on requirements of the service required by the application 40 such as, for example, scalability and read/write bandwidth, decides to which resource in the cloud 42 the service should be mapped. At this time, specialized code/calls may be created for each generic API call to match/comply with the API and consistency protocols of the vendor.

Figure 3:
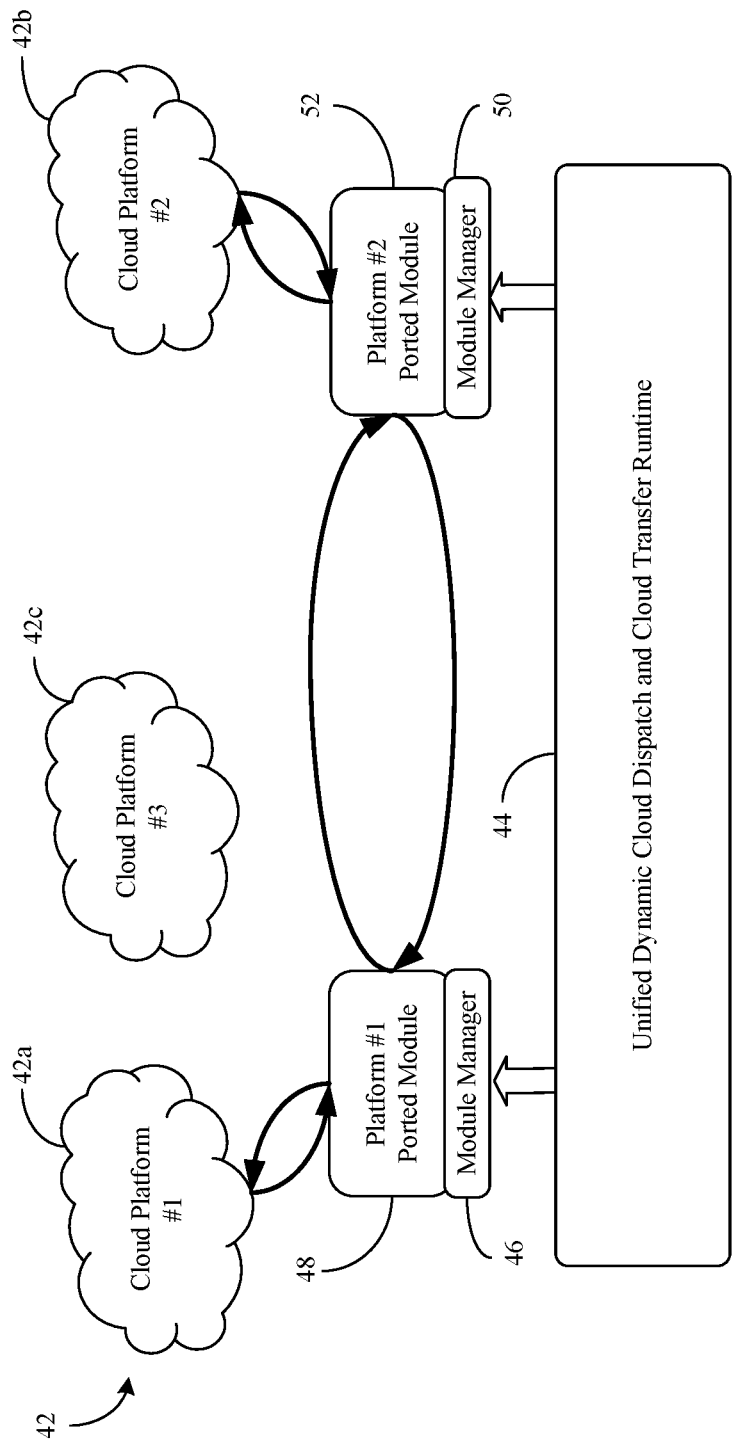
FIG. 3 is a block diagram of an example of a ported cloud application on a heterogeneous cloud computing architecture according to an embodiment.

FIG. 3 shows a ported cloud application. In the illustrated example, communications are established between the first ported module 48 and the first cloud platform 42a, between the second ported module 52 and the second cloud platform 52, and between the first ported module 48 and the second ported module 52. Other than compute resource requirement/constraint considerations, factors such as the service price may also be considered by the dispatch 44 (e.g., by deploying a dynamic bidding scheme amongst cloud providers).

Figure 4:
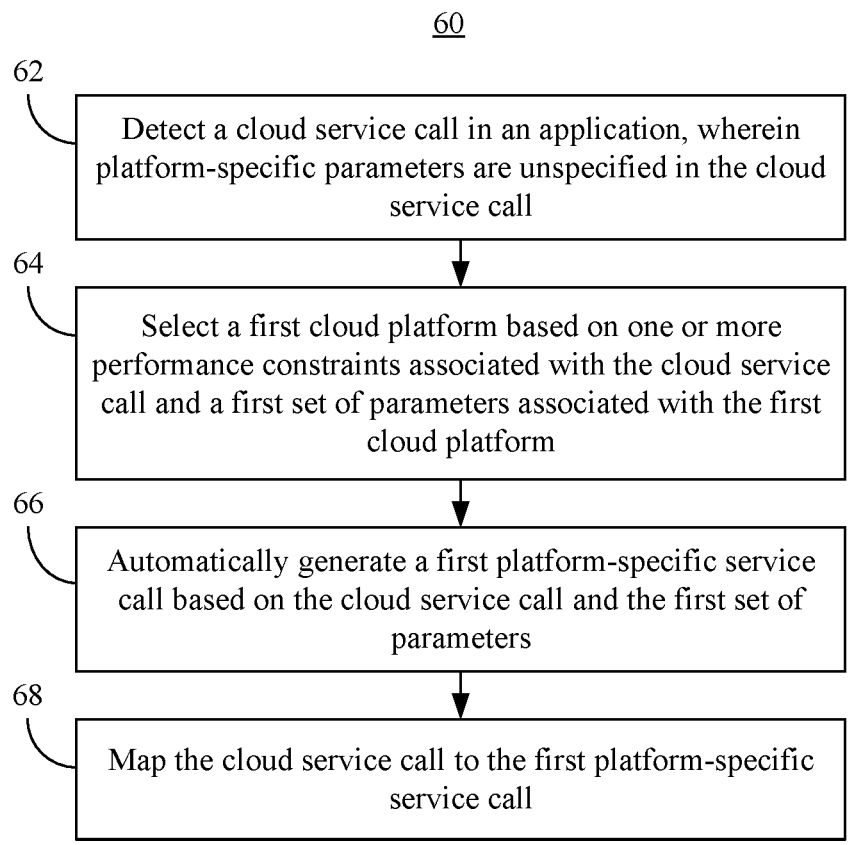
FIG. 4 is a flowchart of an example of a method of porting an application to a heterogeneous cloud according to an embodiment.

FIG. 4 shows a method 60 of porting an application to a heterogeneous cloud. The method 60 may generally be implemented in a dispatch and/or runtime engine such as, for example, the dispatch 44 (FIGS. 2 and 3), already discussed. More particularly, the method 60 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 62 detects a generic cloud service call in an application, wherein platform-specific parameters are unspecified in the cloud service call. For example, if the cloud service call relates to a database service, the call might involve the creation of a key-value database table, addition of rows/columns, removal of items, initiation of queries, updating of queries, etc., using generic API calls without specifying vendor-specific APIs or modules. A first cloud platform is selected at block 64 based on one or more performance constraints (e.g., scalability and/or read/write bandwidth requirements) and a first set of parameters (e.g., vendor-specific APIs and/or modules) associated with the first cloud platform.

Block 66 provides for automatically generating a first platform-specific service call based on the cloud service call and the first set of parameters. In one example, block 66 includes using a combination of compiler analysis to detect backward/forward code slices related to/surrounding a generic call—such as exception handling code and query response post processing—and series of specialized codelets that are precompiled/generated for the API calls corresponding to each vendor. In an embodiment, block 68 maps the cloud service call to the first platform-specific service call. The illustrated method 60 therefore enhances performance, scalability, efficiency and/or cost effectiveness by enabling an application with unspecified platform-specific parameters to be ported to a cloud platform.

Figure 5:
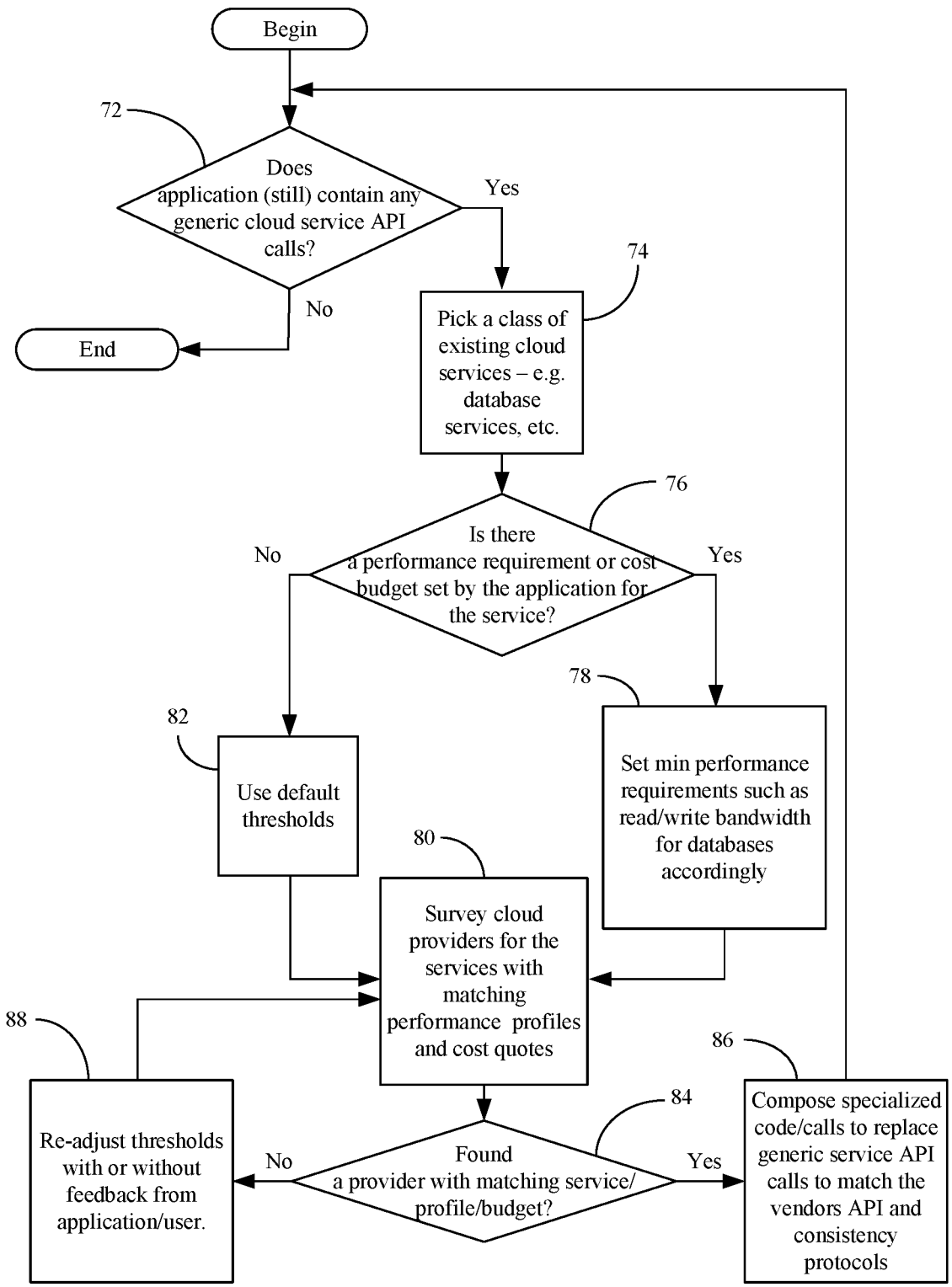
FIG. 5 is a flowchart of an example of a more detailed method of porting an application to a heterogeneous cloud according to an embodiment.

FIG. 5 shows a more detailed method 70 of porting an application to a heterogeneous cloud. The method 70 may generally be implemented in a dispatch and/or runtime engine such as, for example, the dispatch 44 (FIGS. 2 and 3), already discussed. More particularly, the method 70 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 72 provides for determining whether the application contains any generic cloud service API calls. If not, the method 70 may terminate. Otherwise, block 74 picks/selects a class of existing cloud services such as, for example, database services. A determination is made at block 76 as to whether there is a performance requirement or cost budget set by the application for the service. If so, minimum ("min") performance requirements (e.g., read/write bandwidth for databases) may be set at block 78 accordingly. Block 80 then provides for surveying cloud providers for the services with matching performance profiles and cost quotes. A determination may then be made at block 84 as to whether a provider has been found with a matching service/profile/budget. If so, block 86 composes specialized code/calls to replace the generic service API calls to match the API and consistency protocols of the vendor. Block 86 may include using a combination of compiler analysis and a series of codelets that are precompiled/generated for the API calls corresponding to each vendor. The illustrated method 70 then returns to block 72.

If there are no performance requirements or cost budget detected at block 76, illustrated block 82 uses default thresholds and the method 70 proceeds to block 80. Additionally, if no providers are found at block 84, block 88 re-adjusts the thresholds (e.g., with or without feedback from the application and/or user). The method 70 may then return to block 80. The method 70 therefore enhances performance, scalability, efficiency and/or cost effectiveness by enabling an application with unspecified platform-specific parameters to be ported to a cloud platform.

Figure 6A:
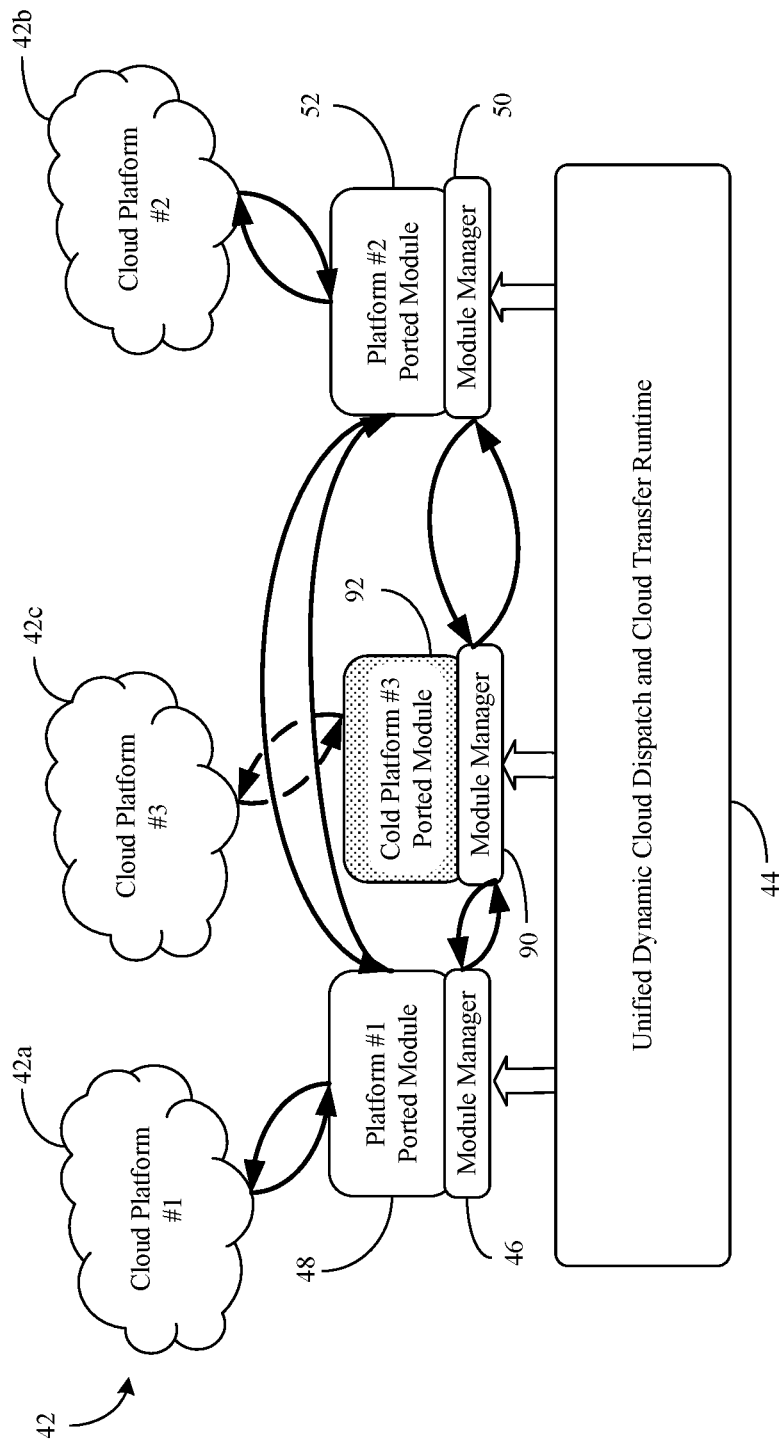
FIG. 6A is a block diagram of an example of an incremental migration of an application between cloud platforms according to an embodiment.

FIG. 6A demonstrates that as the availability of the service, requirements of the application, or even the pricing changes during the lifecycle of an application, the illustrated dispatch 44 is able to gradually migrate all or part of an application from one cloud provider to another with little or minimal disruption of application execution. In the illustrated example, the dispatch 44 uses a third module manager 90 to generate a third ported module 92 for the third cloud platform 42*c*, which will ultimately replace the second cloud platform 42*b*. During runtime, and while state data is being transferred from the second cloud platform 42*b* to the third cloud platform 42*c*, the illustrated third ported module 92 is considered "cold." As will be discussed in greater detail, the transfer of state data may be tracked in a manner that enables the migration to be effectively transparent to the application user.

Figure 6B:
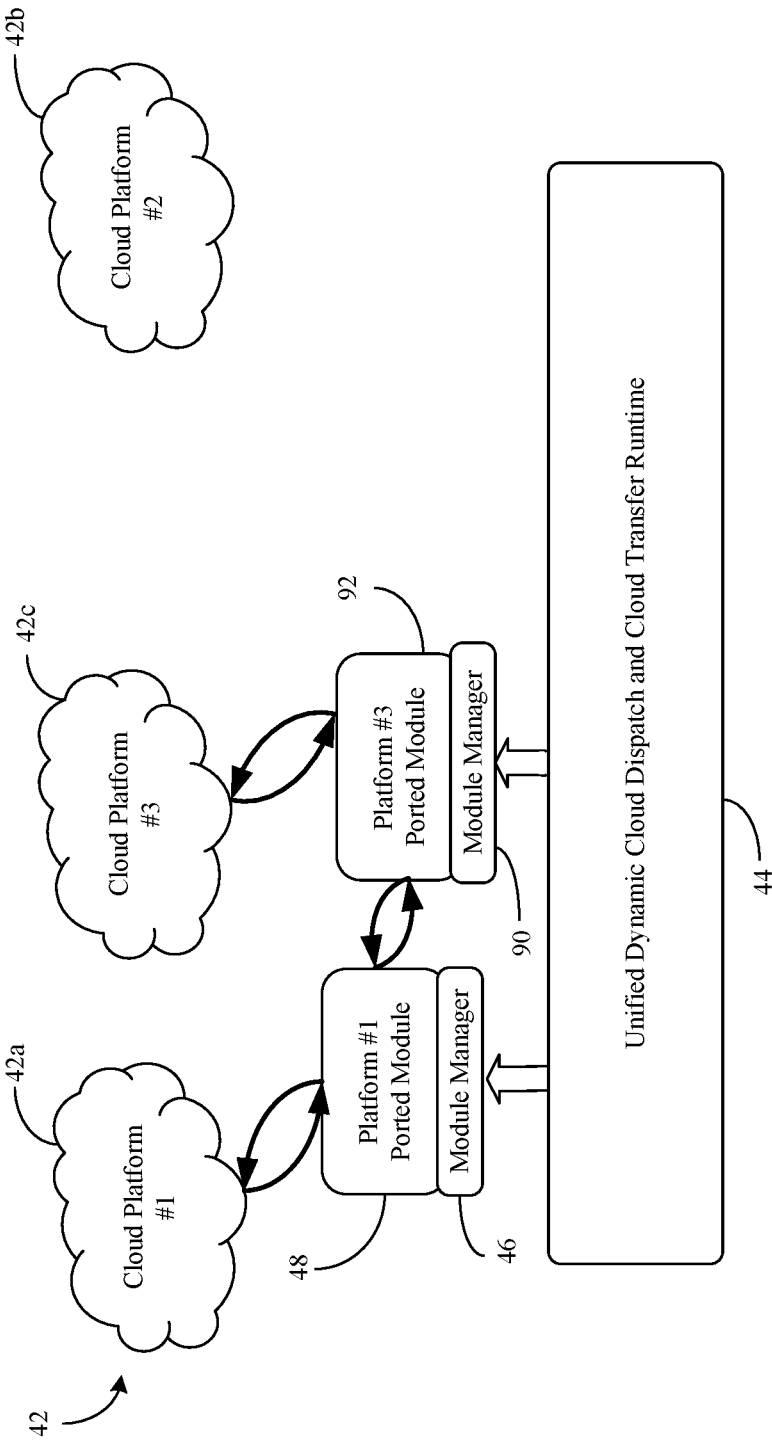
FIG. 6B is a block diagram of an example of a completed migration of an application between cloud platforms according to an embodiment.

Turning now to FIG. 6B, a completed migration is shown. In the illustrated example, communications are established between the third ported module 92 and the third cloud platform 42*c* and between the third ported module 92 and the first ported module 48. Additionally, the transfer of internal state data is complete, so the third ported module 92 is no longer considered to be cold.

Figure 7:
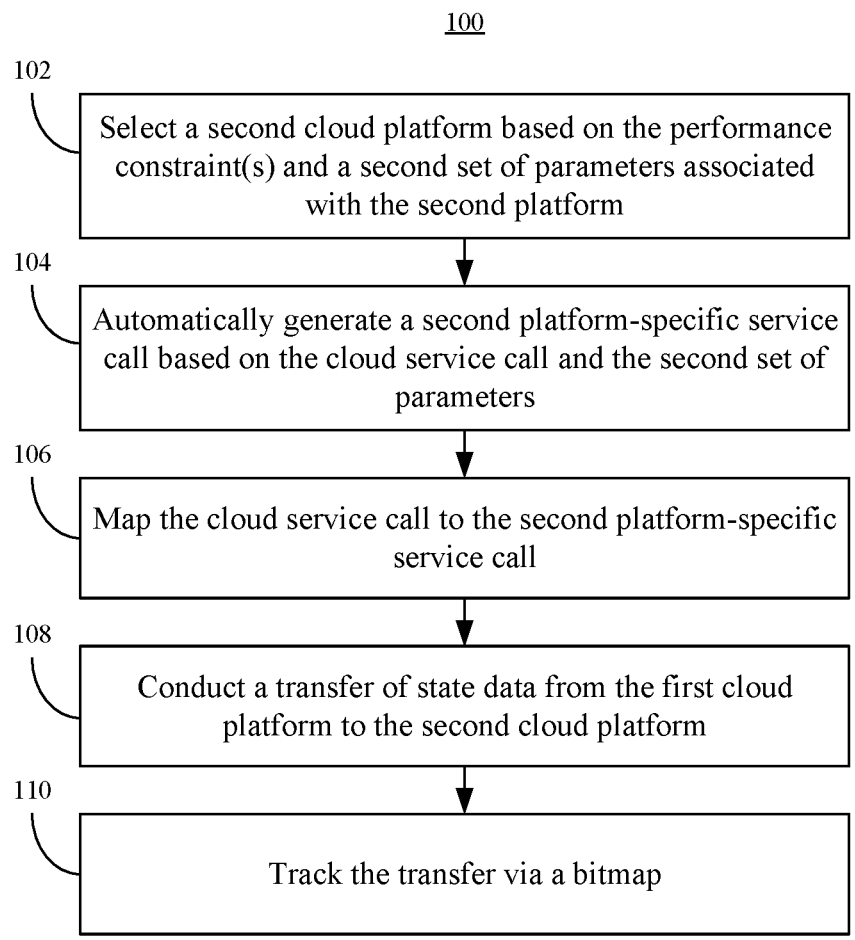
FIG. 7 is a flowchart of an example of a method of migrating an application between cloud platforms according to an embodiment.

FIG. 7 shows a method 100 of migrating an application between cloud platforms according to an embodiment. The method 100 may generally be implemented in a dispatch and/or runtime engine such as, for example, the dispatch 44 (FIGS. 2, 3, 6A and 6B), already discussed. More particularly, the method 100 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 102 selects a second cloud platform based on the one or more performance constraints (e.g., scalability and/or read/write bandwidth requirements) and a second set of parameters (e.g., vendor-specific APIs and/or modules) associated with the second platform. Block 104 may automatically generate a second platform-specific call based on the generic cloud service call and the second set of parameters. In an embodiment, block 104 includes using a combination of compiler analysis and a series of codelets that are precompiled/generated for the API calls corresponding to each service provider/vendor. The generic cloud service call may be mapped to the second platform-specific service call at block 106. Block 108 conducts a transfer of state data from the first cloud platform to the second cloud platform, where illustrated block 110 tracks the transfer via a bitmap. In an embodiment, each bit of the bitmap corresponds to a segment, byte and/or portion (e.g., subset) of the internal state of the current (e.g., "old") cloud platform. Thus, the bitmap may be updated as the various subsets of the internal state are transferred (e.g., either via a direct copy by the dispatch/runtime or write operations of the application) to the next (e.g., "second" or "new") cloud platform. The illustrated method 100 therefore enhances performance, scalability, efficiency and/or cost effectiveness by enabling an application with unspecified platform-specific parameters to be transparently migrated between cloud platforms.

Figure 8:
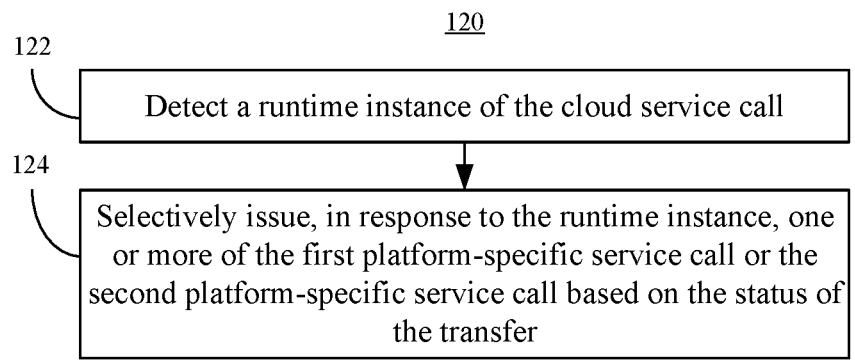
FIG. 8 is a flowchart of an example of a method of handling cloud service calls according to an embodiment.

FIG. 8 shows a method 120 of handling cloud service calls. The method 120 may generally be implemented in a dispatch and/or runtime engine such as, for example, the dispatch 44 (FIGS. 2, 3, 6A and 6B), already discussed. More particularly, the method 120 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 122 provides for detecting a runtime instance of the cloud service call. As already noted, platform-specific parameters may be unspecified in (e.g., absent from) the cloud service call. In an embodiment, block 124 selectively issues, in response to the runtime instance, one or more of the first platform-specific service call or the second platform-specific service call based on the status of the transfer. For example, if the cloud service call only impacts subsets of the state data that have already been transferred to the second (e.g., new) cloud platform, block 124 may issue both the first and the second platform-specific service calls. By contrast, if the cloud service call impacts subsets of the state data that have not yet been transferred to the second cloud platform, block 124 may issue only the first platform-specific service call (e.g., to the first cloud platform). Such an approach may ensure that the migration occurs incrementally and transparently.

Figure 9A:
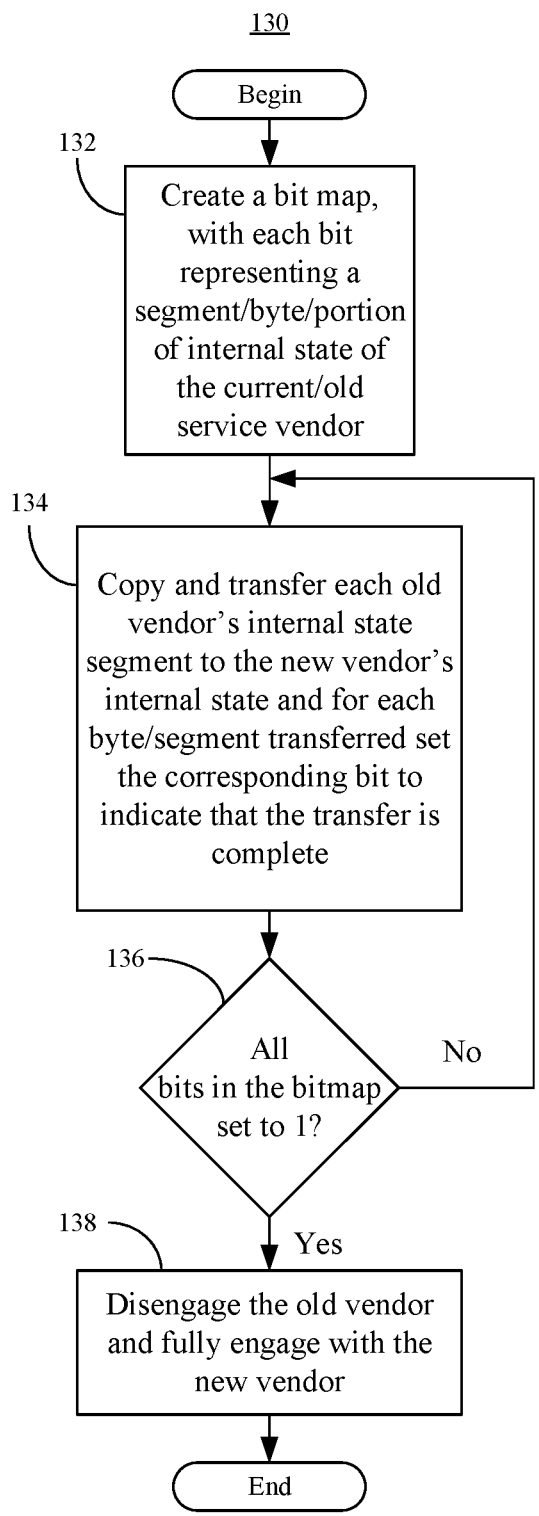
FIG. 9A is a flowchart of an example of a method of transferring state data between cloud platforms according to an embodiment.

FIG. 9A shows a method 130 of transferring state data between cloud platforms. The method 130 may generally be implemented in a dispatch and/or runtime engine such as, for example, the dispatch 44 (FIGS. 2, 3, 6A and 6B), already discussed. More particularly, the method 130 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 132 creates a bitmap, with each bit representing a segment, byte or portion of the internal state of the current/old service vendor (e.g., cloud platform). In an embodiment, block 134 copies and transfers each internal state segment of the old vendor to the internal state of the new vendor. Additionally, for each byte/segment transferred, block 134 may set the corresponding bit in the bitmap to indicate that the transfer is complete. A determination may be made at block 136 as to whether all bits of the bitmap have been set. If not, the illustrated method 130 returns to block 134. Otherwise, block 138 disengages the old vendor and fully engages with the new vendor and the method 130 terminates.

Figure 9B:
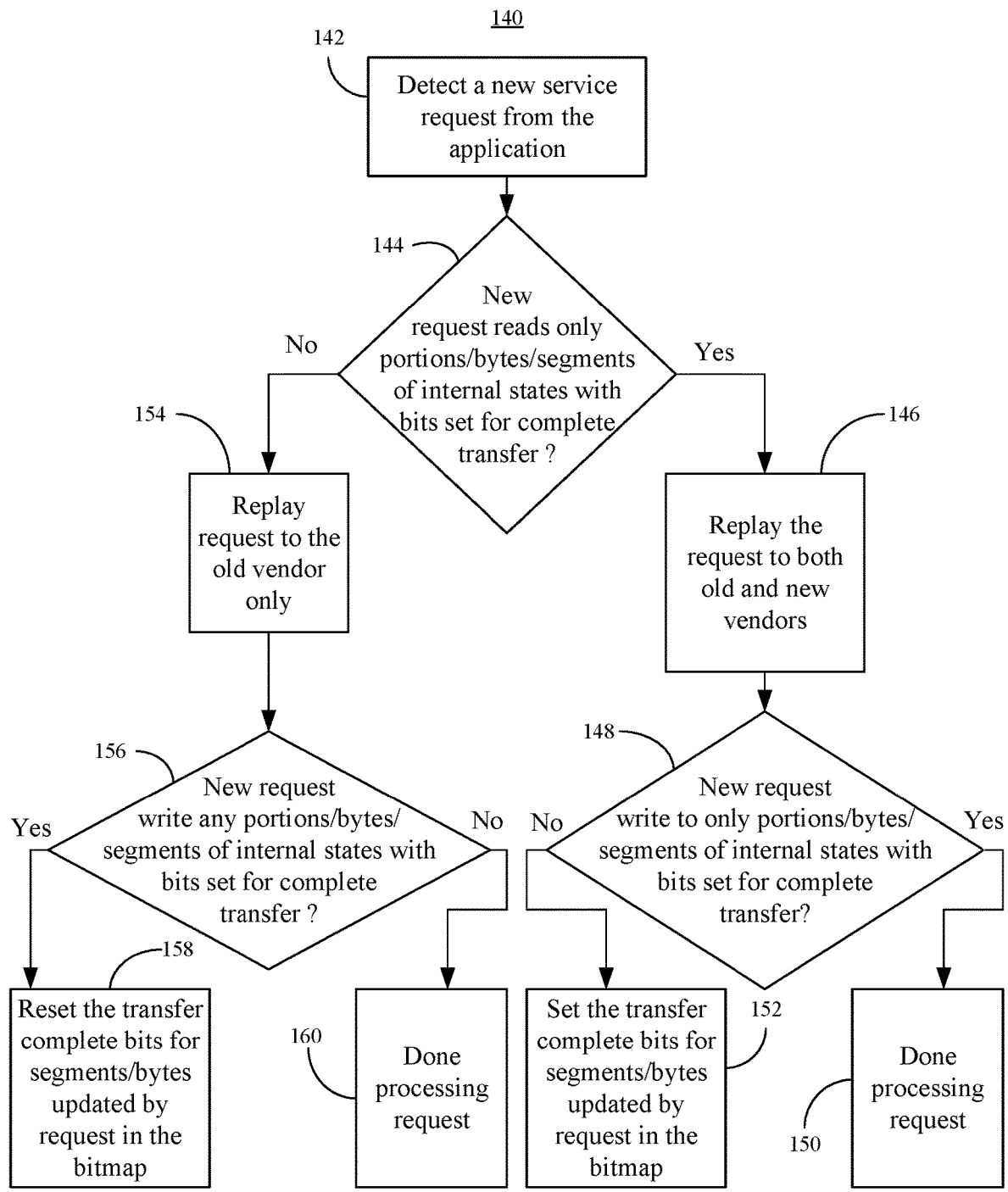
FIG. 9B is a flowchart of an example of a more detailed method of handling cloud service calls according to an embodiment.

FIG. 9B shows a more detailed method 140 of handling cloud service calls. The method 140 may generally be implemented in a dispatch and/or runtime engine such as, for example, the dispatch 44 (FIGS. 2, 3, 6A and 6B), already discussed. More particularly, the method 140 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 142 detects a new service request (e.g., instance of the cloud service call) from the application. In an embodiment, a determination is made at block 144 as to whether the new request reads only subsets of the internal state with bits set for complete transfer. If so, the request may be replayed (e.g., issued via platform-specific service calls) to both the old and new vendors (e.g., cloud platforms) at block 146. In one example, block 148 then determines whether the new request writes only to subsets of the internal state with bits set for complete transfer. If so, processing of the request completes at block 150. If it is determined at block 148 that the new request does not write only to subsets of the internal state with bits set for complete transfer, block 152 sets the transfer complete bits for the subset updated by the request.

If it is determined at block 144 that the new request does not read only subsets of the internal state with bits set for complete transfer, illustrated block 154 replays (e.g., issues via a platform-specific service call) the request to the old vendor only. Additionally, a determination may be made at block 156 as to whether the new request writes to any of the subset of the internal state with bits set for complete transfer. If so, block 158 clears/resets the transfer complete bits for the subset of the internal state updated by the request. Otherwise, processing of the request completes at block 160.

Figure 10:
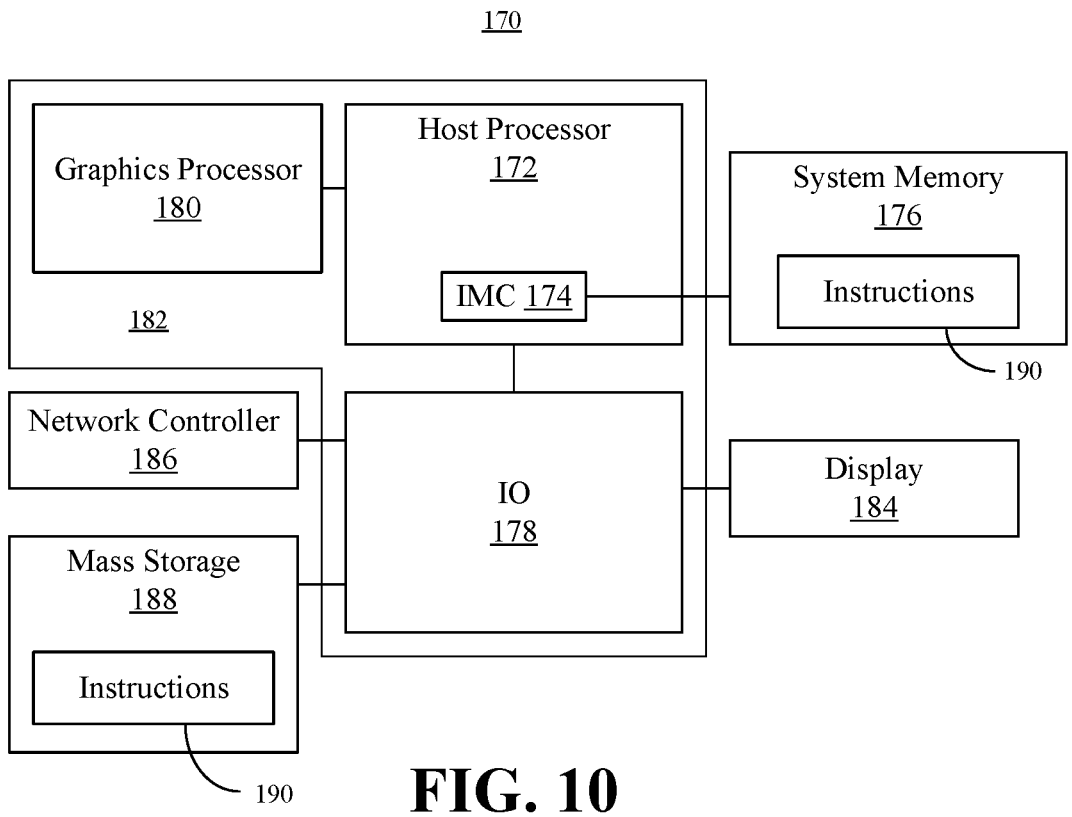
FIG. 10 is a block diagram of an example of a performance-enhanced computing system according to an embodiment.

Turning now to FIG. 10, a performance-enhanced computing system 170 is shown. The system 170 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 170 includes a host processor 172 having an integrated memory controller (IMC) 174 that is coupled to a system memory 176.

The illustrated system 170 also includes an input output (IO) module 178 implemented together with the host processor 172 and a graphics processor 180 on a semiconductor die 182 as a system on chip (SoC). The illustrated IO module 178 communicates with, for example, a display 184 (e.g., touch screen, liquid crystal display/LCD, light emitting diode/LED display), a network controller 186 (e.g., wired and/or wireless), and mass storage 188 (e.g., hard disk drive/HDD, optical disk, solid state drive/SSD, flash memory).

In an embodiment, the host processor 172, the graphics processor 180 and/or the IO module 178 execute program instructions 190 retrieved from the system memory 176 and/or the mass storage 188 to perform one or more aspects of the method 60 (FIG. 4), the method 70 (FIG. 5), the method 100 (FIG. 7), the method 120 (FIG. 8), the method 130 (FIG. 9A), and/or the method 140 (FIG. 9B), already discussed. Thus, execution of the illustrated instructions 190 may cause the computing system 170 to detect a cloud service call in an application, wherein platform-specific parameters are unspecified in the cloud service call, and select a first cloud platform based on one or more performance constraints associated with the cloud service call and a first set of parameters associated with the first cloud platform. Execution of the instructions 190 may also cause the computing system 170 to automatically generate a first platform-specific service call based on the cloud service call and the first set of parameters.

Moreover, execution of the instructions 190 may cause the computing system 170 to select a second cloud platform based on the performance constraint(s) and a second set of parameters associated with the second cloud platform and automatically generate a second platform-specific service call based on the cloud service call and the second set of parameters. The illustrated computing system 170 is therefore performance-enhanced at least to the extent that it ports applications with generic cloud service calls to cloud platforms and/or migrates the applications between cloud platforms.

Figure 11:
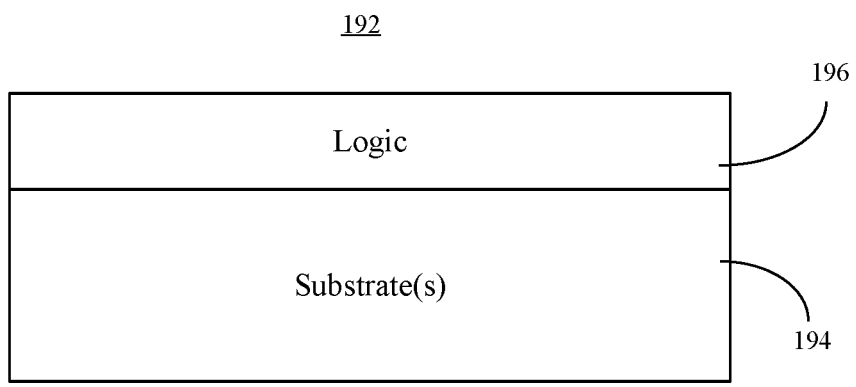
FIG. 11 is an illustration of an example of a semiconductor apparatus according to an embodiment.

FIG. 11 shows a semiconductor package apparatus 192. The illustrated apparatus 192 includes one or more substrates 194 (e.g., silicon, sapphire, gallium arsenide) and logic 196 (e.g., transistor array and other integrated circuit/IC components) coupled to the substrate(s) 194. The logic 196 may be implemented at least partly in configurable logic or fixed-functionality logic hardware. In one example, the logic 196 implements one or more aspects of the method 60 (FIG. 4), the method 70 (FIG. 5), the method 100 (FIG. 7), the method 120 (FIG. 8), the method 130 (FIG. 9A), and/or the method 140 (FIG. 9B), already discussed. Thus, the logic 196 may detect a cloud service call in an application, wherein platform-specific parameters are unspecified in the cloud service call, and select a first cloud platform based on one or more performance constraints associated with the cloud service call and a first set of parameters associated with the first cloud platform. The logic 196 may also automatically generate a first platform-specific service call based on the cloud service call and the first set of parameters.

Moreover, the logic 196 may select a second cloud platform based on the performance constraint(s) and a second set of parameters associated with the second cloud platform and automatically generate a second platform-specific service call based on the cloud service call and the second set of parameters. The illustrated apparatus 192 is therefore performance-enhanced at least to the extent that it ports applications with generic cloud service calls to cloud platforms and/or migrates the applications between cloud platforms.

In one example, the logic 196 includes transistor channel regions that are positioned (e.g., embedded) within the substrate(s) 194. Thus, the interface between the logic 196 and the substrate(s) 194 may not be an abrupt junction. The logic 196 may also be considered to include an epitaxial layer that is grown on an initial wafer of the substrate(s) 194.

Figure 12:
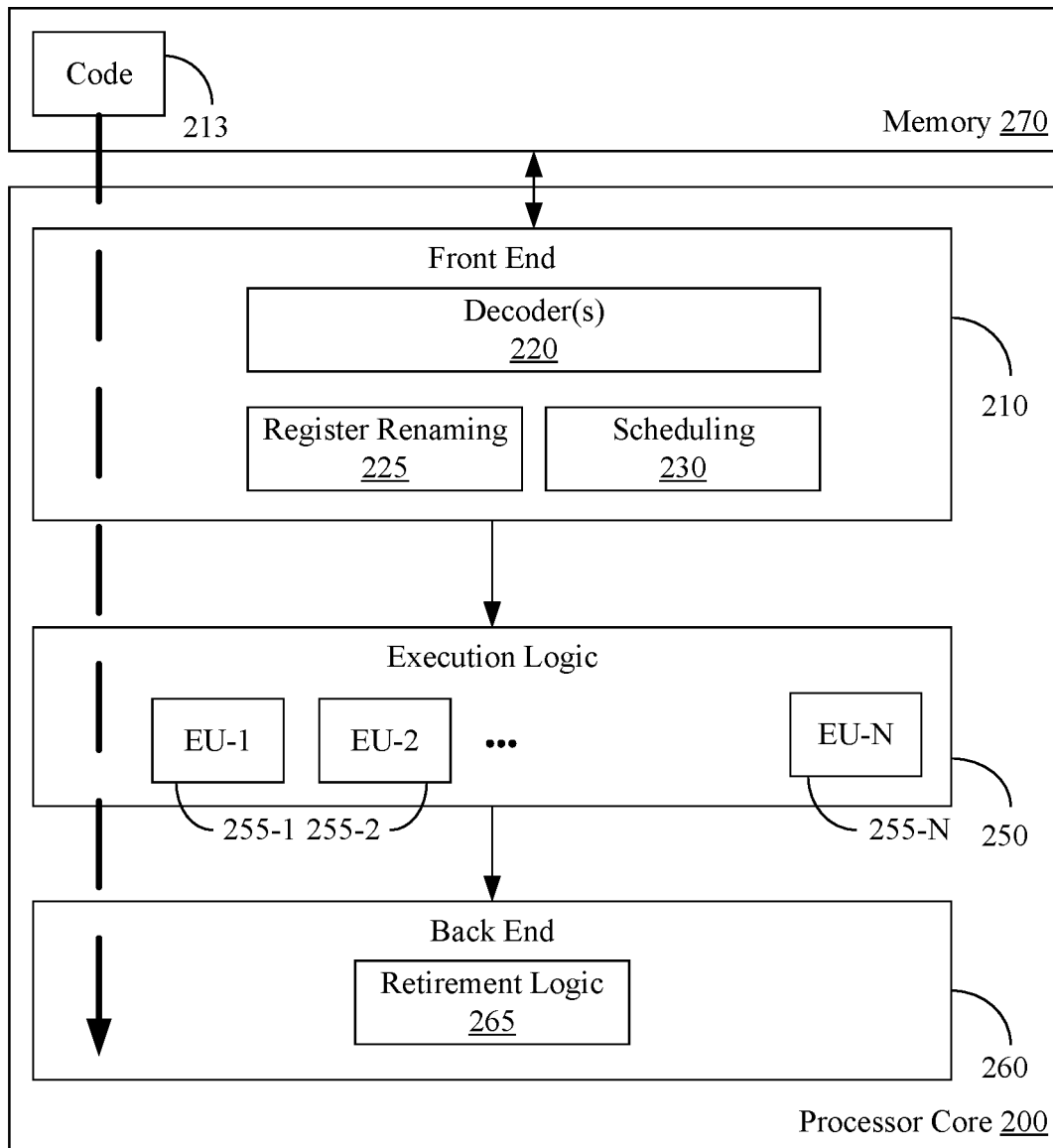
FIG. 12 is a block diagram of an example of a processor according to an embodiment.

FIG. 12 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 12, a processing element may alternatively include more than one of the processor core 200 illustrated in FIG. 12. The processor core 200 may be a single-threaded core or, for at least one embodiment, the processor core 200 may be multithreaded in that it may include more than one hardware thread context (or "logical processor") per core.

FIG. 12 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 60 (FIG. 4), the method 70 (FIG. 5), the method 100 (FIG. 7), the method 120 (FIG. 8), the method 130 (FIG. 9A), and/or the method 140 (FIG. 9B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 12, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 13:
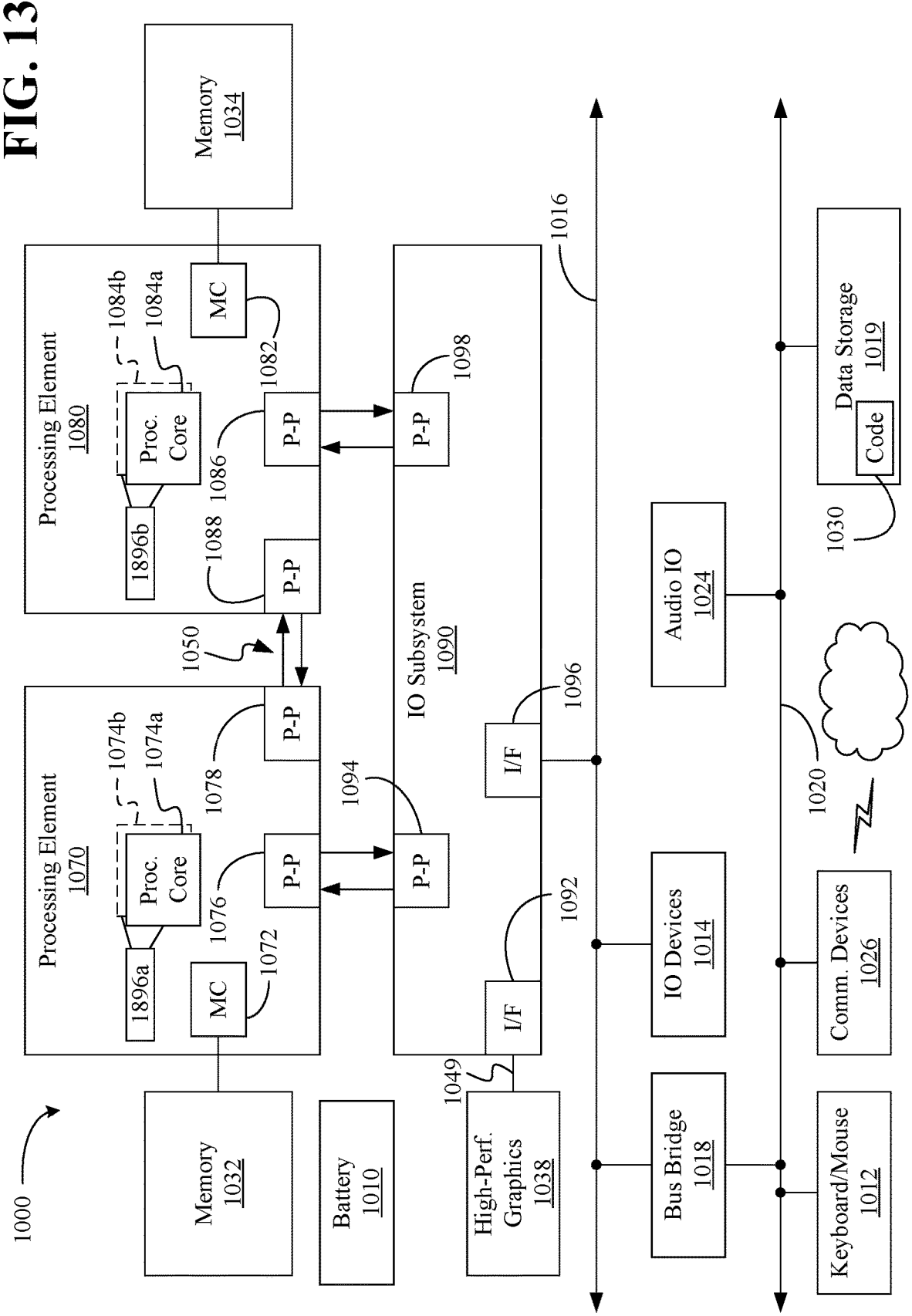
FIG. 13 is a block diagram of an example of a multiprocessor based computing system according to an embodiment.

Referring now to FIG. 13, shown is a block diagram of a computing system 1000 embodiment in accordance with an embodiment. Shown in FIG. 13 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 13 may be implemented as a multi-drop bus rather than point-to-point interconnect.

As shown in FIG. 13, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 12.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 13, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 13, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 13, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 60 (FIG. 4), the method 70 (FIG. 5), the method 100 (FIG. 7), the method 120 (FIG. 8), the method 130 (FIG. 9A), and/or the method 140 (FIG. 9B), already discussed. Further, an audio I/O 1024 may be coupled to second bus 1020 and a battery 1010 may supply power to the computing system 1000.

Note that other embodiments are contemplated. For example, instead of the point-to-point architecture of FIG. 13, a system may implement a multi-drop bus or another such communication topology. Also, the elements of FIG. 13 may alternatively be partitioned using more or fewer integrated chips than shown in FIG. 13.

Additional Notes and Examples

Example 1 includes a performance-enhanced computing system comprising a network controller, a processor coupled to the network controller, an a memory coupled to the processor, the memory comprising a set of executable program instructions, which when executed by the processor, cause the computing system to detect a cloud service call in an application, wherein platform-specific parameters are to be unspecified in the cloud service call, select a first cloud platform based on one or more performance constraints associated with the cloud service call and a first set of parameters associated with the first cloud platform, and automatically generate a first platform-specific service call based on the cloud service call and the first set of parameters.

Example 2 includes the computing system of Example 1, wherein the instructions, when executed, cause the computing system to map the cloud service call to the first platform-specific service call.

Example 3 includes the computing system of any one of Examples 1 to 2, wherein the instructions, when executed, further cause the computing system to select a second cloud platform based on the one or more performance constraints and a second set of parameters associated with the second cloud platform, automatically generate a second platform-specific service call based on the cloud service call and the second set of parameters, and map the cloud service call to the second platform-specific service call.

Example 4 includes the computing system of Example 3, wherein the instructions, when executed, further cause the computing system to conduct a transfer of state data from the first cloud platform to the second cloud platform.

Example 5 includes the computing system of Example 4, wherein the instructions, when executed, further cause the computing system to track the transfer via a bitmap.

Example 6 includes the computing system of Example 4, wherein the instructions, when executed, further cause the computing system to detect a runtime instance of the cloud service call, and selectively issue, in response to the runtime instance, one or more of the first platform-specific service call or the second platform-specific service call based on a status of the transfer.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to detect a cloud service call in an application, wherein platform-specific parameters are to be unspecified in the cloud service call, select a first cloud platform based on one or more performance constraints associated with the cloud service call and a first set of parameters associated with the first cloud platform, and automatically generate a first platform-specific service call based on the cloud service call and the first set of parameters.

Example 8 includes the semiconductor apparatus of Example 7, wherein the logic coupled to the one or more substrates is to map the cloud service call to the first platform-specific service call.

Example 9 includes the semiconductor apparatus of any one of Examples 7 to 8, wherein the logic coupled to the one or more substrates is to select a second cloud platform based on the one or more performance constraints and a second set of parameters associated with the second cloud platform, automatically generate a second platform-specific service call based on the cloud service call and the second set of parameters, and map the cloud service call to the second platform-specific service call.

Example 10 includes the semiconductor apparatus of Example 9, wherein the logic coupled to the one or more substrates is to conduct a transfer of state data from the first cloud platform to the second cloud platform.

Example 11 includes the semiconductor apparatus of Example 10, wherein the logic coupled to the one or more substrates is to track the transfer via a bitmap.

Example 12 includes the semiconductor apparatus of Example 10, wherein the logic coupled to the one or more substrates is to detect a runtime instance of the cloud service call, and selectively issue, in response to the runtime instance, one or more of the first platform-specific service call or the second platform-specific service call based on a status of the transfer.

Example 13 includes at least one computer readable storage medium comprising a set of executable program instructions, which when executed by a computing system, cause the computing system to detect a cloud service call in an application, wherein platform-specific parameters are to be unspecified in the cloud service call, select a first cloud platform based on one or more performance constraints associated with the cloud service call and a first set of parameters associated with the first cloud platform, and automatically generate a first platform-specific service call based on the cloud service call and the first set of parameters.

Example 14 includes the at least one computer readable storage medium of Example 13, wherein the instructions, when executed, cause the computing system to map the cloud service call to the first platform-specific service call.

Example 15 includes the at least one computer readable storage medium of any one of Examples 13 to 14, wherein the instructions, when executed, further cause the computing system to select a second cloud platform based on the one or more performance constraints and a second set of parameters associated with the second cloud platform, automatically generate a second platform-specific service call based on the cloud service call and the second set of parameters, and map the cloud service call to the second platform-specific service call.

Example 16 includes the at least one computer readable storage medium of Example 15, wherein the instructions, when executed, further cause the computing system to conduct a transfer of state data from the first cloud platform to the second cloud platform.

Example 17 includes the at least one computer readable storage medium of Example 16, wherein the instructions, when executed, further cause the computing system to track the transfer via a bitmap.

Example 18 includes the at least one computer readable storage medium of Example 16, wherein the instructions, when executed, further cause the computing system to detect a runtime instance of the cloud service call, and selectively issue, in response to the runtime instance, one or more of the first platform-specific service call or the second platform-specific service call based on a status of the transfer.

Example 19 includes a method of operating a performance-enhanced computing system, the method comprising detecting a cloud service call in an application, wherein platform-specific parameters are unspecified in the cloud service call, selecting a first cloud platform based on one or more performance constraints associated with the cloud service call and a first set of parameters associated with the first cloud platform, and automatically generating a first platform-specific service call based on the cloud service call and the first set of parameters.

Example 20 includes the method of Example 19, further including mapping the cloud service call to the first platform-specific service call.

Example 21 includes the method of any one of Examples 19 to 20, further including selecting a second cloud platform based on the one or more performance constraints and a second set of parameters associated with the second cloud platform, automatically generating a second platform-specific service call based on the cloud service call and the second set of parameters, and mapping the cloud service call to the second platform-specific service call.

Example 22 includes the method of Example 21, further including conducting a transfer of state data from the first cloud platform to the second cloud platform.

Example 23 includes the method of Example 22, further including tracking the transfer via a bitmap.

Example 24 includes the method of Example 22, further including detecting a runtime instance of the cloud service call, and selectively issuing, in response to the runtime instance, one or more of the first platform-specific service call or the second platform-specific service call based on a status of the transfer.

Example 25 includes means for performing the method of any one of Examples 19 to 24.

Thus, technology described herein provides a unified programming interface for targeting generic cloud services and a runtime that transparently moves an application or parts of it to benefit from different cloud vendor services. The cloud application developers may write their code once using generic cloud service APIs as described herein. A runtime may port/map the generic API to available/optimal cloud services (e.g., choosing from a pool of vendors). The runtime may also provide for gradual migration of the application or specific modules from one cloud vendor to another one without disrupting service.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a network controller;
   a processor coupled to the network controller; and
   a memory coupled to the processor, the memory comprising a set of executable program instructions, which when executed by the processor, cause the computing system to:
   detect a cloud service call in an application, wherein platform-specific parameters are to be unspecified in the cloud service call,
   select a first cloud platform based on one or more performance constraints associated with the cloud service call and a first set of parameters associated with the first cloud platform,
   automatically generate a first platform-specific service call based on the cloud service call and the first set of parameters,
   identify that a second platform-specific service call is to be generated on a second cloud platform and based on the cloud service call,
   if the cloud service call only impacts a portion of state data of the first platform-specific service call that has been transferred to the second cloud platform from the first cloud platform, issue both the first and second platform-specific service calls, and
   if the cloud service call impacts subsets of the state data that have not been transferred to the second cloud platform from the first cloud platform, issue only the first platform-specific service call.

2. The computing system of claim 1, wherein the instructions, when executed, cause the computing system to map the cloud service call to the first platform-specific service call.

3. The computing system of claim 1, wherein the instructions, when executed, further cause the computing system to:
   select the second cloud platform based on the one or more performance constraints and a second set of parameters associated with the second cloud platform,
   automatically generate the second platform-specific service call based on the cloud service call and the second set of parameters, and
   map the cloud service call to the second platform-specific service call.

4. The computing system of claim 3, wherein the instructions, when executed, further cause the computing system to conduct a transfer of the state data from the first cloud platform to the second cloud platform.

5. The computing system of claim 4, wherein the instructions, when executed, further cause the computing system to track the transfer via a bitmap.

6. The computing system of claim 4, wherein the instructions, when executed, further cause the computing system to:
   detect a runtime instance of the cloud service call, and
   selectively issue, in response to the runtime instance, one or more of the first platform-specific service call or the second platform-specific service call based on a status of the transfer.

7. A semiconductor apparatus comprising:
   one or more substrates; and
   logic coupled to the one or more substrates, wherein the logic is implemented at least partly in one or more of configurable logic or fixed-functionality hardware logic, the logic coupled to the one or more substrates to:
   detect a cloud service call in an application, wherein platform-specific parameters are to be unspecified in the cloud service call;
   select a first cloud platform based on one or more performance constraints associated with the cloud service call and a first set of parameters associated with the first cloud platform;
   automatically generate a first platform-specific service call based on the cloud service call and the first set of parameters;
   identify that a second platform-specific service call is to be generated on a second cloud platform and based on the cloud service call;
   if the cloud service call only impacts a portion of state data of the first platform-specific service call that has been transferred to the second cloud platform from the first cloud platform, issue both the first and second platform-specific service calls; and
   if the cloud service call impacts subsets of the state data that have not been transferred to the second cloud platform from the first cloud platform, issue only the first platform-specific service call.

8. The semiconductor apparatus of claim 7, wherein the logic coupled to the one or more substrates is to map the cloud service call to the first platform-specific service call.

9. The semiconductor apparatus of claim 7, wherein the logic coupled to the one or more substrates is to:

select the second cloud platform based on the one or more performance constraints and a second set of parameters associated with the second cloud platform;
automatically generate the second platform-specific service call based on the cloud service call and the second set of parameters; and
map the cloud service call to the second platform-specific service call.

10. The semiconductor apparatus of claim 9, wherein the logic coupled to the one or more substrates is to conduct a transfer of the state data from the first cloud platform to the second cloud platform.

11. The semiconductor apparatus of claim 10, wherein the logic coupled to the one or more substrates is to track the transfer via a bitmap.

12. The semiconductor apparatus of claim 10, wherein the logic coupled to the one or more substrates is to:
detect a runtime instance of the cloud service call; and
selectively issue, in response to the runtime instance, one or more of the first platform-specific service call or the second platform-specific service call based on a status of the transfer.

13. At least one non-transitory computer readable storage medium comprising a set of executable program instructions, which when executed by a computing system, cause the computing system to:
detect a cloud service call in an application, wherein platform-specific parameters are to be unspecified in the cloud service call;
select a first cloud platform based on one or more performance constraints associated with the cloud service call and a first set of parameters associated with the first cloud platform;
automatically generate a first platform-specific service call based on the cloud service call and the first set of parameters;
identify that a second platform-specific service call is to be generated on a second cloud platform and based on the cloud service call;
if the cloud service call only impacts a portion of state data of the first platform-specific service call that has been transferred to the second cloud platform from the first cloud platform, issue both the first and second platform-specific service calls; and
if the cloud service call impacts subsets of the state data that have not been transferred to the second cloud platform from the first cloud platform, issue only the first platform-specific service call.

14. The at least one non-transitory computer readable storage medium of claim 13, wherein the instructions, when executed, cause the computing system to map the cloud service call to the first platform-specific service call.

15. The at least one non-transitory computer readable storage medium of claim 13, wherein the instructions, when executed, further cause the computing system to:
select the second cloud platform based on the one or more performance constraints and a second set of parameters associated with the second cloud platform;
automatically generate the second platform-specific service call based on the cloud service call and the second set of parameters; and
map the cloud service call to the second platform-specific service call.

16. The at least one non-transitory computer readable storage medium of claim 15, wherein the instructions, when executed, further cause the computing system to conduct a transfer of the state data from the first cloud platform to the second cloud platform.

17. The at least one non-transitory computer readable storage medium of claim 16, wherein the instructions, when executed, further cause the computing system to track the transfer via a bitmap.

18. The at least one non-transitory computer readable storage medium of claim 16, wherein the instructions, when executed, further cause the computing system to:
detect a runtime instance of the cloud service call; and
selectively issue, in response to the runtime instance, one or more of the first platform-specific service call or the second platform-specific service call based on a status of the transfer.

19. A method comprising:
detecting a cloud service call in an application, wherein platform-specific parameters are unspecified in the cloud service call;
selecting a first cloud platform based on one or more performance constraints associated with the cloud service call and a first set of parameters associated with the first cloud platform;
automatically generating a first platform-specific service call based on the cloud service call and the first set of parameters;
identifying that a second platform-specific service call is to be generated on a second cloud platform and based on the cloud service call;
if the cloud service call only impacts a portion of state data of the first platform-specific service call that has been transferred to the second cloud platform from the first cloud platform, issuing both the first and second platform-specific service calls; and
if the cloud service call impacts subsets of the state data that have not been transferred to the second cloud platform from the first cloud platform, issuing only the first platform-specific service call.

20. The method of claim 19, further including mapping the cloud service call to the first platform-specific service call.

21. The method of claim 19, further including:
selecting the second cloud platform based on the one or more performance constraints and a second set of parameters associated with the second cloud platform;
automatically generating the second platform-specific service call based on the cloud service call and the second set of parameters; and
mapping the cloud service call to the second platform-specific service call.

22. The method of claim 21, further including conducting a transfer of the state data from the first cloud platform to the second cloud platform.

23. The method of claim 22, further including tracking the transfer via a bitmap.

24. The method of claim 22, further including:
detecting a runtime instance of the cloud service call; and
selectively issuing, in response to the runtime instance, one or more of the first platform-specific service call or the second platform-specific service call based on a status of the transfer.

* * * * *